US012615431B2

(12) United States Patent
Shindo

(10) Patent No.: US 12,615,431 B2
(45) Date of Patent: Apr. 28, 2026

(54) IMAGE SHOOTING CONTROL APPARATUS AND CONTROL METHOD THEREOF, IMAGE CAPTURING APPARATUS, AND STORAGE MEDIUM

(71) Applicant: CANON KABUSHIKI KAISHA, Tokyo (JP)

(72) Inventor: Masahiro Shindo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 18/409,393

(22) Filed: Jan. 10, 2024

(65) Prior Publication Data

US 2024/0244312 A1 Jul. 18, 2024

(30) Foreign Application Priority Data

Jan. 13, 2023 (JP) ................................. 2023-004062

(51) Int. Cl.
| | |
|---|---|
| *H04N 23/611* | (2023.01) |
| *G06T 7/11* | (2017.01) |
| *G06T 7/70* | (2017.01) |
| *H04N 23/695* | (2023.01) |

(52) U.S. Cl.
CPC .............. *H04N 23/611* (2023.01); *G06T 7/11* (2017.01); *G06T 7/70* (2017.01); *H04N 23/695* (2023.01); *G06T 2207/20021* (2013.01); *G06T 2207/20076* (2013.01); *G06T 2207/30201* (2013.01)

(58) Field of Classification Search
CPC ...... H04N 23/611; H04N 23/695; G06T 7/11; G06T 7/70; G06T 2207/20021; G06T 2207/20076; G06T 2207/30201
See application file for complete search history.

(56) References Cited

U.S. PATENT DOCUMENTS

| | | | | |
|---|---|---|---|---|
| 2011/0285808 A1* | 11/2011 | Feng | ...................... | H04N 7/142 |
| | | | | 348/E7.083 |
| 2016/0073117 A1* | 3/2016 | Grasmug | ............... | H04N 19/23 |
| | | | | 375/240.26 |

FOREIGN PATENT DOCUMENTS

| | | |
|---|---|---|
| JP | 2018050146 A | 3/2018 |

* cited by examiner

*Primary Examiner* — Yogesh K Aggarwal
(74) *Attorney, Agent, or Firm* — Canon U.S.A., Inc. IP Division

(57) ABSTRACT

In an image shooting control apparatus, an acquisition unit acquires image data obtained by an image sensor, a detection unit detects a subject from the image data, a map creation unit creates an environmental map, a storage unit stores history information that associates the subject with a divided area in which the subject exists among a plurality of divided areas obtained by dividing the environmental map, a determination unit finds probability of existence of the subject for each divided area based on the history information and determines an order of the plurality of divided areas to be searched for the subject based on the probability of existence, and a control unit controls an orientation of the image sensor so as to shoot the plurality of divided areas in the determined order.

22 Claims, 15 Drawing Sheets

F I G. 1B
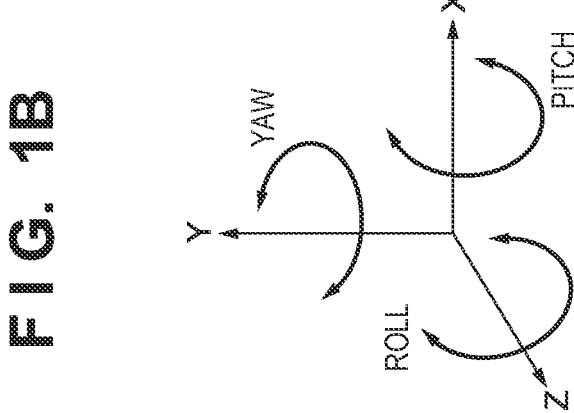
F I G. 1A
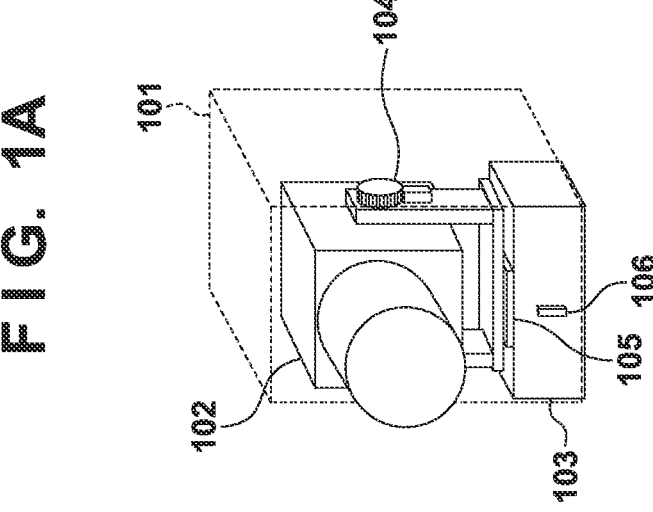

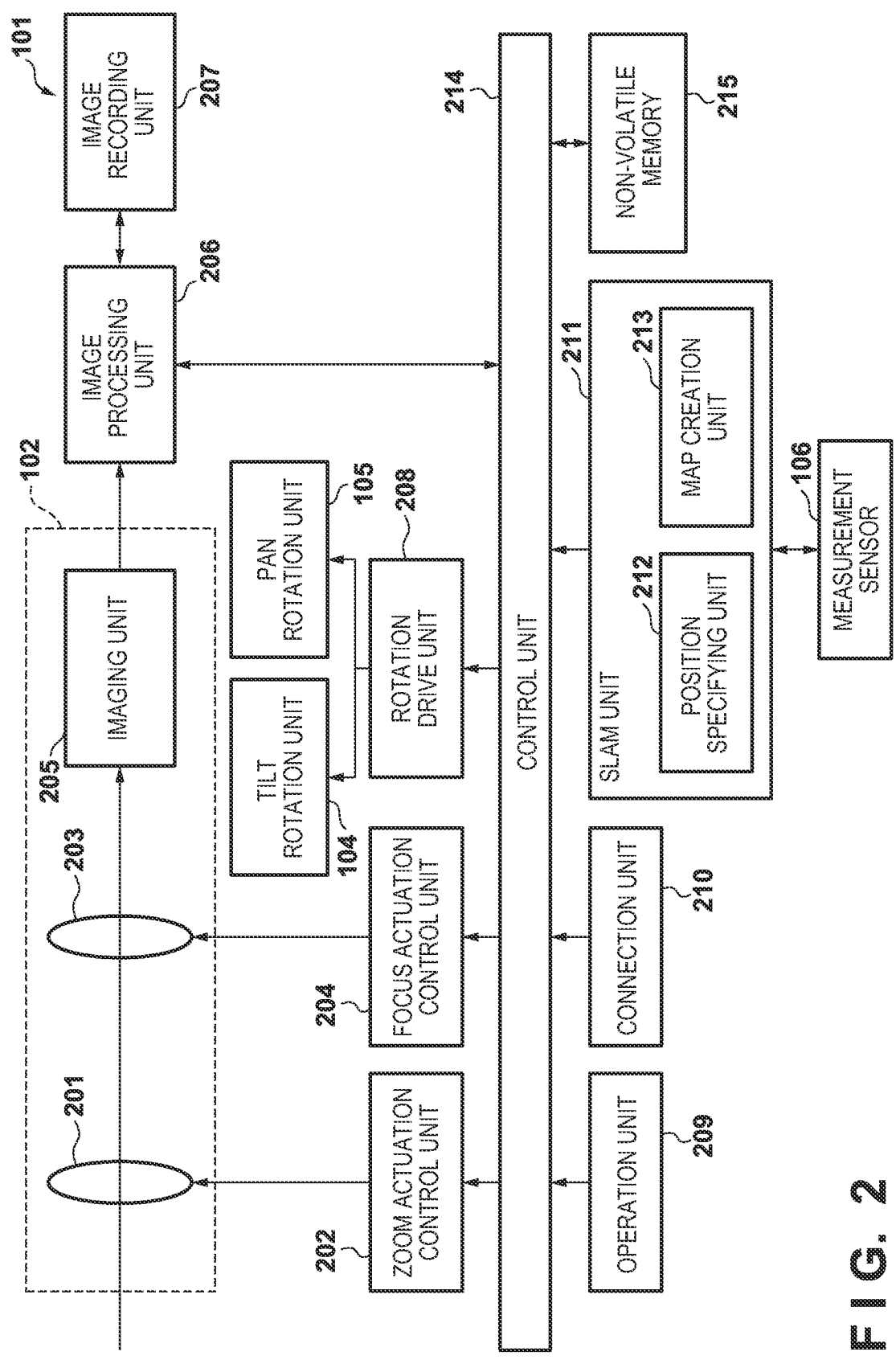
F I G. 2

F I G. 3A
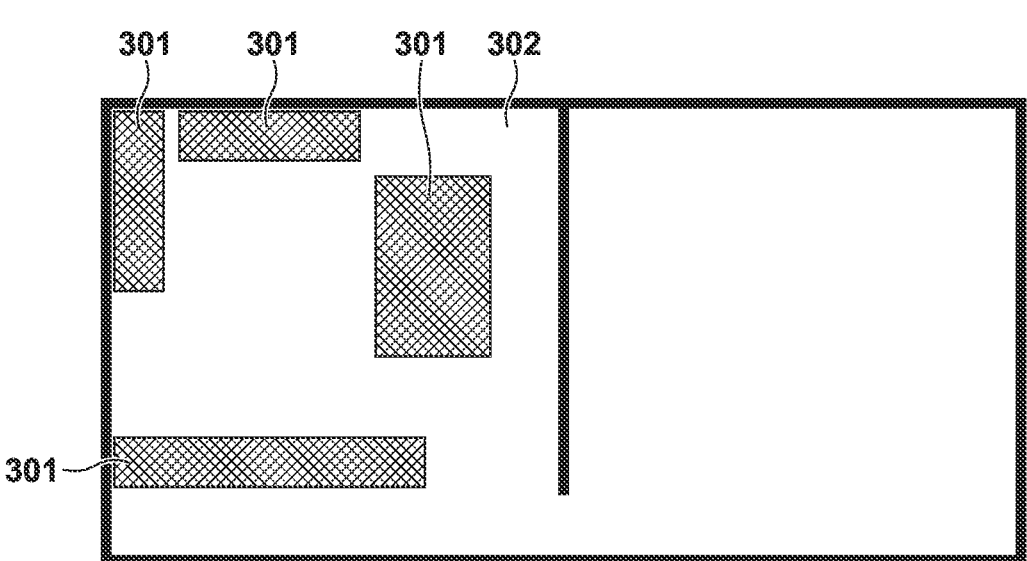
F I G. 3B
| 303 | | | | | | | | | | | | | 402 |
|---|---|---|---|---|---|---|---|---|---|---|---|---|---|
| 1 | 2 | 3 | 4 | 5 | 6 | 7 | 8 | 9 | 10 | 11 | 12 | 13 | 14 |
| 28 | 27 | 26 | 25 | 24 | 23 | 22 | 21 | 20 | 19 | 18 | 17 | 16 | 15 |
| 29 | 30 | 31 | 32 | 33 | 34 | 35 | 36 | 37 | 38 | 39 | 40 | 41 | 42 |
| 56 | 55 | 54 | 53 | 52 | 51 | 50 | 49 | 48 | 47 | 46 | 45 | 44 | 43 |
| 57 | 58 | 59 | 60 | 61 | 62 | 63 | 64 | 65 | 66 | 67 | 68 | 69 | 70 |
| 84 | 83 | 82 | 81 | 80 | 79 | 78 | 77 | 76 | 75 | 74 | 73 | 72 | 71 |
| 85 | 86 | 87 | 88 | 89 | 90 | 91 | 92 | 93 | 94 | 95 | 96 | 97 | 98 |

F I G.  6

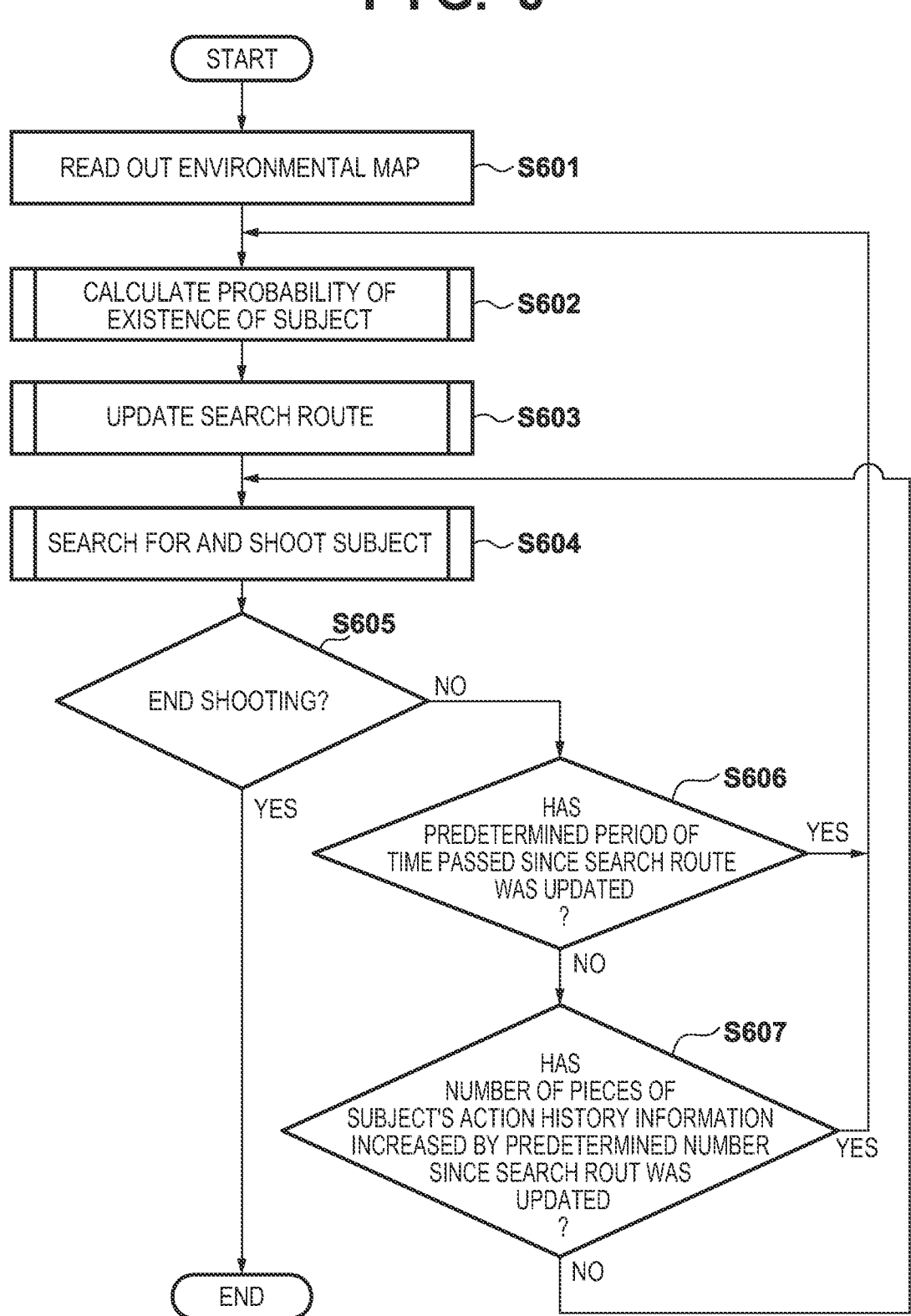

START

READ OUT ENVIRONMENTAL MAP — S601

CALCULATE PROBABILITY OF EXISTENCE OF SUBJECT — S602

UPDATE SEARCH ROUTE — S603

SEARCH FOR AND SHOOT SUBJECT — S604

S605
END SHOOTING?
NO
YES

S606
HAS PREDETERMINED PERIOD OF TIME PASSED SINCE SEARCH ROUTE WAS UPDATED ?
YES
NO

S607
HAS NUMBER OF PIECES OF SUBJECT'S ACTION HISTORY INFORMATION INCREASED BY PREDETERMINED NUMBER SINCE SEARCH ROUT WAS UPDATED ?
YES
NO

END

F I G. 8

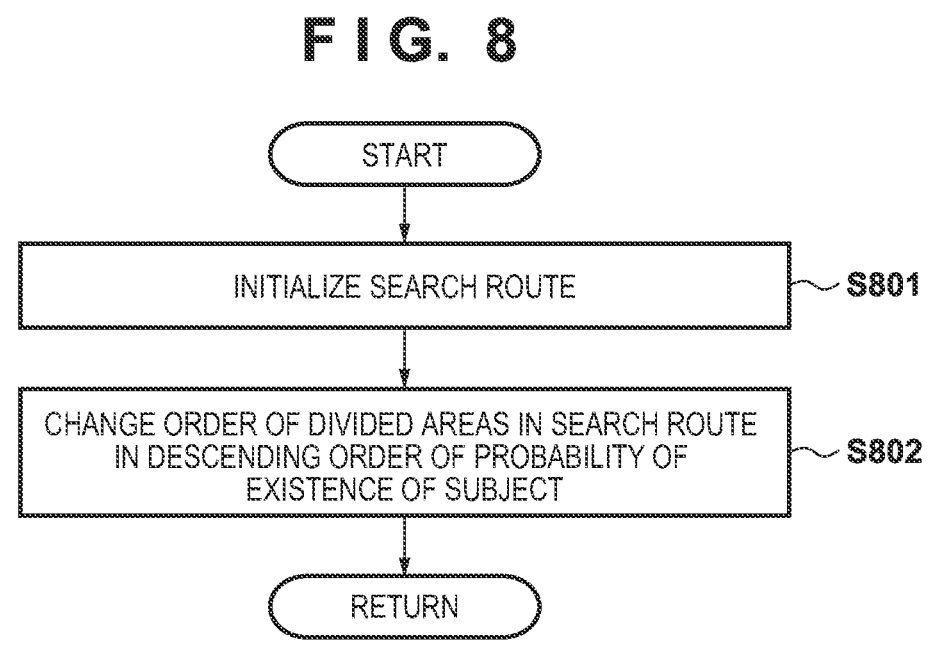

START

INITIALIZE SEARCH ROUTE — S801

CHANGE ORDER OF DIVIDED AREAS IN SEARCH ROUTE
IN DESCENDING ORDER OF PROBABILITY OF
EXISTENCE OF SUBJECT — S802

RETURN

F I G. 9

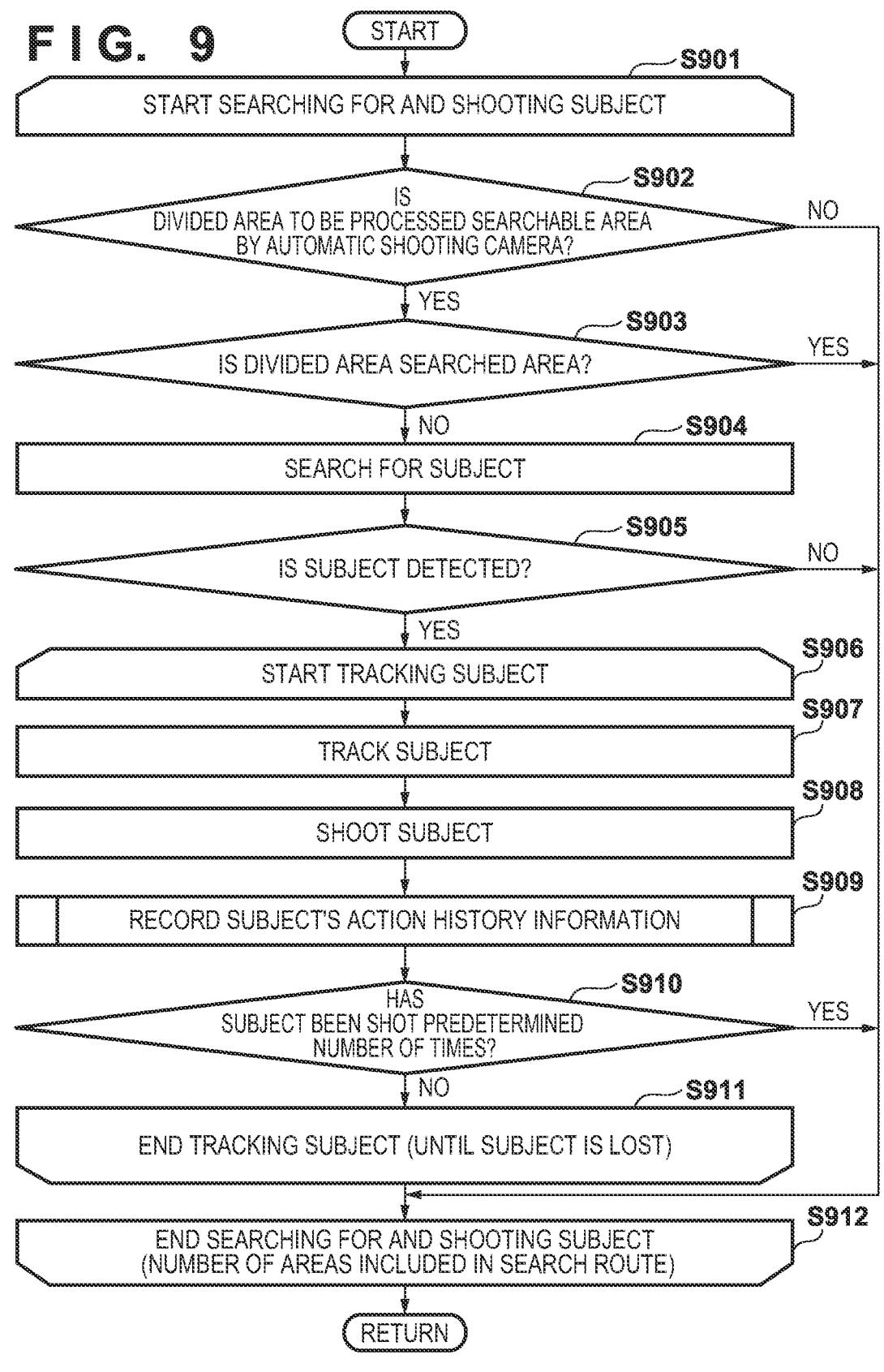

START

S901 START SEARCHING FOR AND SHOOTING SUBJECT

S902 IS DIVIDED AREA TO BE PROCESSED SEARCHABLE AREA BY AUTOMATIC SHOOTING CAMERA?  — NO

YES

S903 IS DIVIDED AREA SEARCHED AREA? — YES

NO

S904 SEARCH FOR SUBJECT

S905 IS SUBJECT DETECTED? — NO

YES

S906 START TRACKING SUBJECT

S907 TRACK SUBJECT

S908 SHOOT SUBJECT

S909 RECORD SUBJECT'S ACTION HISTORY INFORMATION

S910 HAS SUBJECT BEEN SHOT PREDETERMINED NUMBER OF TIMES? — YES

NO

S911 END TRACKING SUBJECT (UNTIL SUBJECT IS LOST)

S912 END SEARCHING FOR AND SHOOTING SUBJECT (NUMBER OF AREAS INCLUDED IN SEARCH ROUTE)

RETURN

F I G. 10
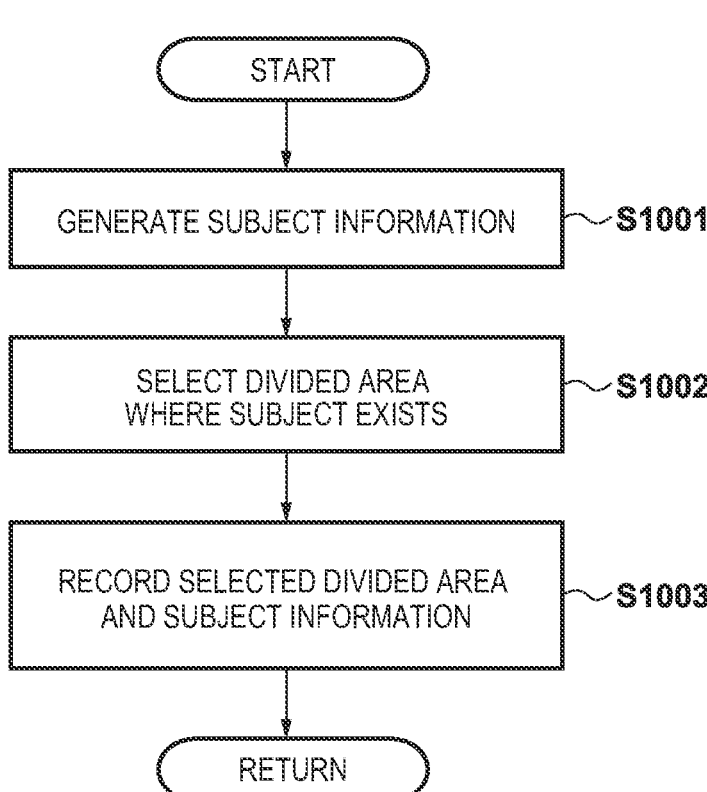

F I G. 12
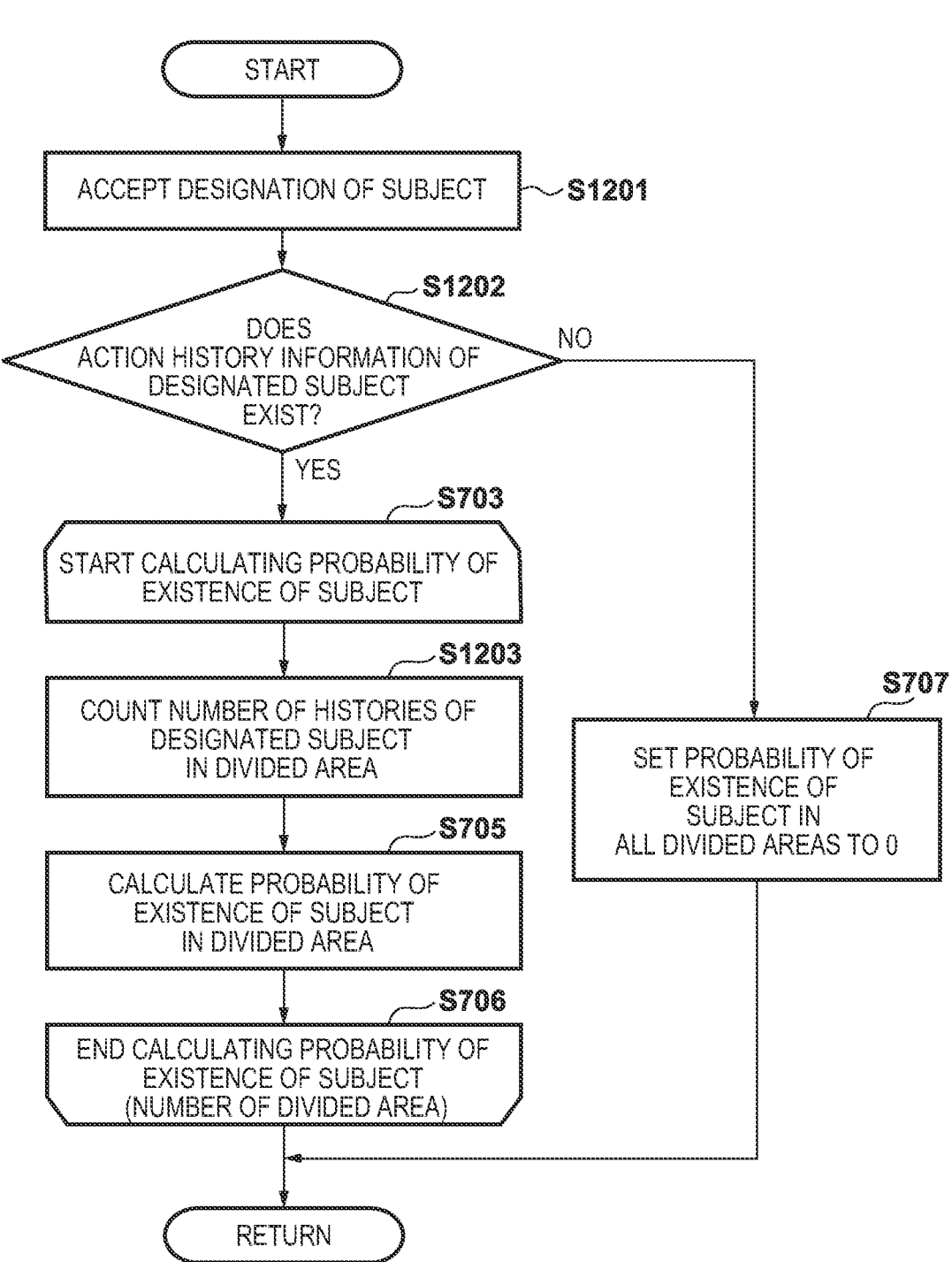

F I G. 13

13a

| ACTION HISTORY | SUBJECT INFORMATION | | TRACKING AREA |
|---|---|---|---|
| | IDENTIFICATION INFORMATION | DATE AND TIME INFORMATION | |
| ACTION HISTORY 1 | SUBJECT A | 09/05/2022, 8:00 | AREA 63 |
| ACTION HISTORY 2 | SUBJECT A | 09/05/2022, 9:00 | AREA 57 |
| ACTION HISTORY 3 | SUBJECT B | 09/05/2022, 10:00 | AREA 63 |
| ACTION HISTORY 4 | SUBJECT B | 09/06/2022, 8:00 | AREA 63 |
| ACTION HISTORY 5 | SUBJECT A | 09/07/2022, 13:00 | AREA 31 |
| ACTION HISTORY 6 | SUBJECT C | 09/07/2022, 13:00 | AREA 31 |

13b

| AREA | PROBABILITY OF EXISTENCE OF SUBJECT |
|---|---|
| AREA 63 | 50.0% |
| AREA 57 | 16.7% |
| AREA 31 | 33.3% |

13c

| SEARCH ROUTE |
|---|
| AREA 63 |
| AREA 31 |
| AREA 57 |

F I G. 14

14a

| ACTION HISTORY | SUBJECT INFORMATION | | TRACKING AREA |
|---|---|---|---|
| | IDENTIFICATION INFORMATION | DATE AND TIME INFORMATION | |
| ACTION HISTORY 1 | SUBJECT A | 09/05/2022, 8:00 | AREA 63 |
| ACTION HISTORY 2 | SUBJECT A | 09/05/2022, 9:00 | AREA 57 |
| ACTION HISTORY 3 | SUBJECT B | 09/05/2022, 10:00 | AREA 63 |
| ACTION HISTORY 4 | SUBJECT B | 09/06/2022, 8:00 | AREA 63 |
| ACTION HISTORY 5 | SUBJECT A | 09/07/2022, 13:00 | AREA 31 |
| ACTION HISTORY 6 | SUBJECT C | 09/07/2022, 13:00 | AREA 31 |

14b

| AREA | PROBABILITY OF EXISTENCE OF SUBJECT |
|---|---|
| AREA 63 | 73.7% |
| AREA 57 | 15.8% |
| AREA 31 | 10.5% |

14c

| SEARCH ROUTE |
|---|
| AREA 63 |
| AREA 57 |
| AREA 31 |

F I G. 15

15a

| ACTION HISTORY | SUBJECT INFORMATION | | TRACKING AREA |
| | IDENTIFICATION INFORMATION | DATE AND TIME INFORMATION | |
|---|---|---|---|
| ACTION HISTORY 1 | SUBJECT A | 09/05/2022, 8:00 | AREA 63 |
| ACTION HISTORY 2 | SUBJECT A | 09/05/2022, 9:00 | AREA 57 |
| ACTION HISTORY 3 | SUBJECT B | 09/05/2022, 10:00 | AREA 63 |
| ACTION HISTORY 4 | SUBJECT B | 09/06/2022, 8:00 | AREA 63 |
| ACTION HISTORY 5 | SUBJECT A | 09/07/2022, 13:00 | AREA 31 |
| ACTION HISTORY 6 | SUBJECT C | 09/07/2022, 13:00 | AREA 31 |

15b

| AREA | PROBABILITY OF EXISTENCE OF SUBJECT |
|---|---|
| AREA 63 | 0.0% |
| AREA 57 | 0.0% |
| AREA 31 | 100.0% |

15c

| SEARCH ROUTE |
|---|
| AREA 31 |
| AREA 57 |
| AREA 63 |

F I G. 16

| ACTION HISTORY | SUBJECT INFORMATION | | TRACKING AREA |
|---|---|---|---|
| | IDENTIFICATION INFORMATION | DATE AND TIME INFORMATION | |
| ACTION HISTORY 1 | SUBJECT A | 09/06/2022, 16:01 | AREA 62 |
| ACTION HISTORY 2 | SUBJECT A | 09/06/2022, 16:02 | AREA 61 |
| ACTION HISTORY 3 | SUBJECT A | 09/06/2022, 16:03 | AREA 60 |
| ACTION HISTORY 4 | SUBJECT A | 09/06/2022, 16:04 | AREA 60 |
| ACTION HISTORY 5 | SUBJECT A | 09/06/2022, 16:05 | AREA 59 |
| ACTION HISTORY 6 | SUBJECT A | 09/06/2022, 16:06 | AREA 58 |

IMAGE SHOOTING CONTROL APPARATUS AND CONTROL METHOD THEREOF, IMAGE CAPTURING APPARATUS, AND STORAGE MEDIUM

BACKGROUND OF THE DISCLOSURE

Field of the Disclosure

The present disclosure relates to an image shooting control apparatus and control method thereof, an image capturing apparatus, and storage medium and, more specifically, to automatic image shooting technology.

Description of the Related Art

In recent years, automatic shooting cameras that regularly and continuously search for a subject and shoot the detected subject without a user giving a shooting instruction have been developed, and are being put into practical use.

In order to shoot a subject existing in the space in which the automatic shooting camera is placed, the automatic shooting camera as described above is required to find the subject existing in the space in a short time.

Japanese Patent Laid-Open No. 2018-050146 discloses a technique in which in order to shorten the search time for a subject, an area is divided into angular regions in spatial coordinates with the position of the imaging apparatus as the origin, the importance level of the subject is determined for each divided area, and a subject is searched based on the calculated importance level.

However, the importance level of the subject calculated as described in Japanese Patent Laid-Open No. 2018-050146 has a circumstance that if the installation location of the automatic shooting camera changes, it is no longer valid information for searching for the subject.

SUMMARY OF THE DISCLOSURE

The present disclosure has been made in consideration of the above situation, and finds a subject in a space where an automatic shooting camera is placed in a shorter time.

According to the present disclosure, provided is an image shooting control apparatus comprising one or more processors and/or circuitry which function as: an acquisition unit that acquires image data obtained through repeated shooting by an image sensor; a detection unit that detects a subject from the image data; a map creation unit that creates an environmental map based on information obtained by measuring surrounding environment; a storage unit that stores history information that associates the subject with a divided area in which the subject exists among a plurality of divided areas obtained by dividing the environmental map; a determination unit that finds probability of existence of the subject for each of the plurality of divided areas based on the history information and determines an order of the plurality of divided areas to be searched for the subject based on the probability of existence; and a control unit that controls an orientation of the image sensor, wherein the control unit controls the image sensor so as to shoot the plurality of divided areas in the order determined by the determination unit.

Further, according to the present disclosure, provided is an image capturing apparatus comprising: an image shooting control apparatus having one or more processors and/or circuitry which function as: an acquisition unit that acquires image data obtained through repeated shooting by an image sensor; a detection unit that detects a subject from the image data; a map creation unit that creates an environmental map based on information obtained by measuring surrounding environment; a storage unit that stores history information that associates the subject with a divided area in which the subject exists among a plurality of divided areas obtained by dividing the environmental map; a determination unit that finds probability of existence of the subject for each of the plurality of divided areas based on the history information and determines an order of the plurality of divided areas to be searched for the subject based on the probability of existence; and a control unit that controls an orientation of the image sensor, the image sensor; and a drive unit that drives the image sensor to change its orientation based on the control of the control unit, wherein the control unit controls the image sensor so as to shoot the plurality of divided areas in the order determined by the determination unit.

Furthermore, according to the present disclosure, provided is a control method of an image shooting control apparatus comprising: causing an image sensor to repeat shooting and output image data; detecting a subject from the image data; creating an environmental map based on information obtained by measuring surrounding environment; storing history information that associates the subject with a divided area in which the subject exists among a plurality of divided areas obtained by dividing the environmental map; finding probability of existence of the subject for each of the plurality of divided areas based on the history information and determining an order of the plurality of divided areas to be searched for the subject based on the probability of existence; and changing an orientation of the image sensor based on the order.

Further, according to the present disclosure, provided is a non-transitory computer-readable storage medium, the storage medium storing a program that is executable by the computer, wherein the program includes program code for causing the computer to executes each step of the control method of the image capturing apparatus comprising: causing an image sensor to repeat shooting and output image data; detecting a subject from the image data; creating an environmental map based on information obtained by measuring surrounding environment; storing history information that associates the subject with a divided area in which the subject exists among a plurality of divided areas obtained by dividing the environmental map; finding probability of existence of the subject for each of the plurality of divided areas based on the history information and determining an order of the plurality of divided areas to be searched for the subject based on the probability of existence; and changing an orientation of the image sensor based on the order.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the present disclosure, and together with the description, serve to explain the principles of the present disclosure.

FIG. 1A is a schematic diagram illustrating an appearance of an automatic shooting camera system according to an embodiment of the present disclosure;

FIG. 1B is a diagram illustrating rotation directions;

FIG. 2 is a block diagram illustrating a functional configuration of the automatic shooting camera system according to the embodiment;

FIGS. 3A and 3B are diagrams illustrating an example of an environmental map according to a first embodiment;

FIG. 6 is a flowchart illustrating a series of processes for searching for and shooting a subject according to the first embodiment;

FIG. 8 is a flowchart illustrating a search route update process according to the first embodiment;

FIG. 9 is a flowchart illustrating a process of searching for and shooting a subject according to the first embodiment;

FIG. 10 is a flowchart illustrating a recording process of subject's action history information according to the first embodiment;

FIG. 12 is a flowchart illustrating a calculation process of probability of existence of subject according to a third embodiment;

FIG. 13 illustrates tables that show examples of subject's action history information, probability of existence of subject, and search route according to the first embodiment;

FIG. 14 illustrates tables that show examples of subject's action history information, probability of existence of subject, and search route according to the second embodiment;

FIG. 15 illustrates tables that show examples of subject's action history information, probability of existence of subject, and search route according to the third embodiment; and FIG. 16 is a table illustrating an example of subject's action history information recorded while the subject is recognized according to the first embodiment.

DESCRIPTION OF THE EMBODIMENTS

Figure 4:
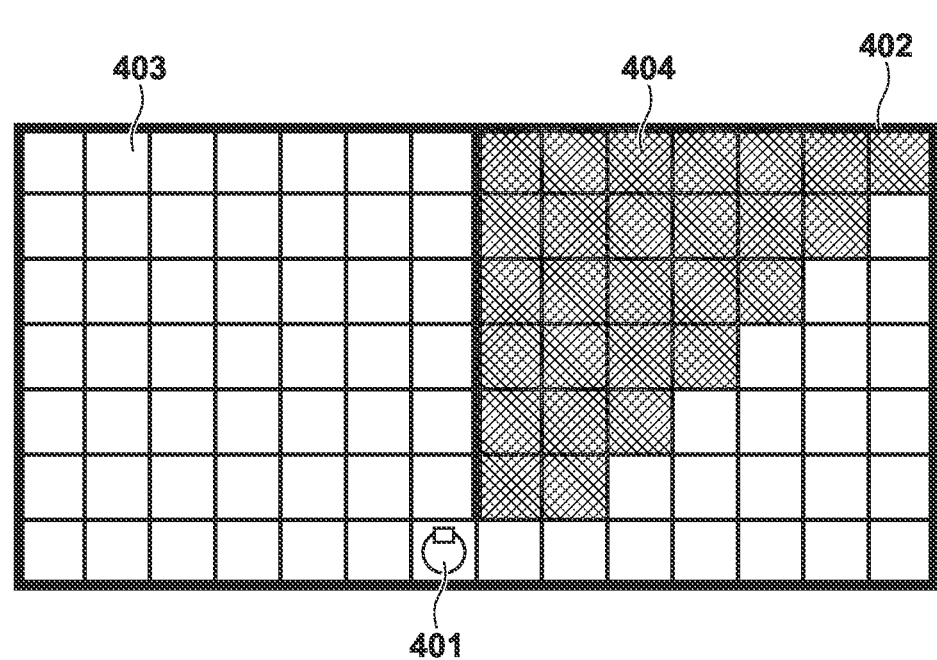
FIG. 4 is a diagram illustrating an example of an environmental map showing areas that can be searched by the automatic shooting camera system according to the first embodiment.

Hereinafter, embodiments will be described in detail with reference to the attached drawings. Note, the following embodiments are not intended to limit the scope of the present disclosure, and limitation is not made to the present disclosure that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

A first embodiment of the present disclosure will be described below.

(Configuration of Automatic Shooting Camera System)

FIG. 1A is a schematic diagram illustrating an appearance of an automatic shooting camera system 101 as an example of an automatic shooting system according to the present embodiment, and FIG. 1B is a diagram illustrating rotation directions.

The automatic shooting camera system 101 shown in FIG. 1A is provided with operation members (not shown), such as a power switch, for operating the camera. Further, an imaging apparatus 102 includes a lens barrel including a photographing lens group as an imaging optical system, and an imaging unit having an image sensor, and is attached to a fixed portion 103 via a pan rotation unit 105, which is a motor drive mechanism capable of rotationally driving the imaging apparatus 102 in the yaw direction (about the Y axis) shown in FIG. 1B.

A tilt rotation unit 104 has a motor drive mechanism that can rotate the imaging apparatus 102 in the pitch direction (about the X axis) shown in FIG. 1B. By driving the pan rotation unit 105 and the tilt rotation unit 104, it is possible to change the direction of the imaging optical system (that is, the shooting direction), and by controlling the operation of these rotation units, the direction of the imaging optical system can be controlled.

A measurement sensor 106 is a sensor for Simultaneous Localization And Mapping (SLAM), and measures the environment around the automatic shooting camera system 101. SLAM is a technology that simultaneously estimates one's own position and creates an environmental map. In this case, the environmental map is a map expressing the surrounding environment of the automatic shooting camera system 101. By utilizing SLAM, even if the installation position of the automatic shooting camera system 101 changes, it is possible to specify the installation location of the automatic shooting camera system 101 on the environmental map. Thereby, even if the installation position of the automatic shooting camera system 101 changes, the relative positional relationship between the installation position of automatic shooting camera system 101 and an arbitrary position can be determined.

Examples of the measurement sensor 106 include a distance measurement sensor capable of measuring the distance to surrounding objects, such as a LiDAR, a stereo camera, and a depth camera, and a camera/image sensor that captures an image of the surrounding environment.

FIG. 2 is a block diagram illustrating the functional configuration of the automatic shooting camera system 101 according to this embodiment.

A zoom unit 201 includes a zoom lens that optically changes magnification and constitutes a photographing lens group as an imaging optical system, and is actuated and controlled by a zoom actuation control unit 202. A focus unit 203 includes a focus lens that performs focus adjustment, which also constitutes the photographing lens group, and is actuated and controlled by a focus actuation control unit 204.

An imaging unit 205 includes an image sensor, and the image sensor receives light incident via the imaging optical system, converts the light into electric charge according to the amount of light, and stores the electric charge. The imaging unit 205 performs A/D conversion on an analog image signal corresponding to the accumulated charge, and outputs an obtained digital image signal to an image processing unit 206.

The image processing unit 206 performs image processing such as distortion correction, white balance adjustment, and color interpolation processing on the output digital image signal, and outputs processed digital image data.

An image recording unit 207 converts the digital image data output from the image processing unit 206 into image data having a recording format such as JPEG format, and records it on a recording medium. As the recording medium, a memory card such as a PCMCIA card or CompactFlash (registered trademark), a hard disk, etc. can be used. Furthermore, a micro DAT, a magneto-optical disk, an optical disk such as a CD-R or a CD-WR, a phase change type optical disk such as a DVD, or the like may also be used.

A rotation drive unit 208 rotates the imaging apparatus 102 in the pitch direction and the yaw direction by driving the tilt rotation unit 104 and the pan rotation unit 105.

An operation unit 209 includes operating members for operating the automatic shooting camera system 101, and is provided with a power button, various switches and buttons for changing settings of the imaging apparatus 102, and the like. When the power button is operated, power is supplied to the automatic shooting camera system 101 according to the purpose, and the imaging apparatus 102 is started.

A connection unit 210 is used to connect the automatic shooting camera system 101 to an information processing apparatus having a wireless communication function such as a smartphone, a tablet terminal, or a PC, and the automatic shooting camera system 101 can exchange data with the information processing apparatus via the connection unit 210.

An SLAM unit 211 includes a position specifying unit 212 and a map creation unit 213. In the SLAM unit 211, the position specifying unit 212 specifies the current position and the map creation unit 213 creates an environmental map in parallel, so that the position of the automatic shooting camera system 101 can be always specified.

The position specifying unit 212 specifies the current position of the automatic shooting camera system 101 by comparing the sensor information acquired from the measurement sensor 106 with the environmental map.

The map creation unit 213 uses the sensor information obtained from the measurement sensor 106 as a user holds the automatic shooting camera system 101 and moves through the space for which the environmental map is to be created, for example, to create an environmental map that represents the surrounding environment of the space in which the automatic shooting camera system 101 is placed. When the creation of the environmental map is completed, the created environmental map is stored in a non-volatile memory 215 and updated. The map creation unit 213 also communicates with the information processing apparatus via the connection unit 210 and notifies the user that the creation of the environmental map has been completed.

A control unit 214 controls the entire system, and controls each unit of the automatic shooting camera system 101 according to input signals and various processes described below.

The non-volatile memory 215 is an electrically erasable/recordable memory, and stores the environmental map created by the SLAM unit 211, constants for operation of the control section 214, programs, etc.

(Environmental Map)

FIGS. 3A and 3B are diagrams showing an example of an environmental map according to the first embodiment of the present disclosure.

As shown in FIG. 3A, examples of the state of the surrounding environment of the automatic shooting camera system 101 represented on the environmental map include objects 301 such as furniture and household appliances, and a space 302 in which a subject can freely move.

In recording the subject's action history information, calculating the probability of existence of subject, updating the search route, and searching for and shooting the subject, which will be described later, the environmental map is divided into divided areas 303 of a certain size, as shown in FIG. 3B, and processes are performed for each divided area 303. Further, each divided area 303 is given an identifier for identifying the area. As a method for giving an identifier as shown in FIG. 3B, first, an identifier "1" is given to the upper leftmost divided area 303 of the environmental map. Next, it is determined whether or not a divided area 303 with no identifier exists around the divided area 303 with the identifier "1", in the order of right, left, below, and above, if there is a divided area 303 with no identifier, an identifier "2" is given to that area. Then, a similar determination is made with respect to the divided are 303 with the identifier "2", and an identifier "3" is assigned. By repeating this process recursively, identifiers are given to all of the divided areas 303. Note that the method for giving identifiers is not limited to this, and may be added based on an arbitrary rules.

(Subject's Action History Information, Probability of Existence of Subject, Search Route)

FIG. 13 illustrates diagrams showing an example of the subject's action history information, the probability of existence of subject, and the search route.

In this embodiment, the subject is a person to be shot by the automatic shooting camera system 101. Detection of a subject is performed by detecting a person's face in an image obtained by applying image processing for subject detection by an image processing unit 206 to a signal captured by the imaging unit 205. Note that various methods have been proposed as methods for detecting faces, and the present disclosure is not limited by the face detection methods. For example, there are known methods that use learning, such as neural networks, and techniques that use template matching to extract parts with characteristic physical shapes, such as eyes and noses, from an image. Other methods include detecting image features such as skin color and eye shape and analyzing them using statistical methods. Since these methods are all well known, detailed explanations thereof will be omitted here.

The subject's action history information shown in a table 13a of FIG. 13 consists of subject information and information indicating a tracking area, and the subject information includes identification information and date and time information. The automatic shooting camera system 101 extracts features of the face of the detected subject in the image, and identifies the subject using the extracted features. The date and time information includes the date and time when the subject was detected. The tracking area is information indicating in which area of the divided areas 303 the subject was detected. In the example shown in the table 13a, the set of items of "subject A", "8:00 on Sep. 5, 2022", and "area 63" (area with identifier 63 among the divided areas 303. The same applies to other areas) is one set of action history information of the subject A.

The probability of existence of subject shown in a table 13b is calculated from all the subject's action history information shown in the table 13a and the subject's action history information in each divided area 303, and is information indicating probabilities of the subject existing in each divided area 303 of the environmental map.

The search route shown in a table 13c is information that determines the order in which the divided areas 303 are to be searched. For example, information indicating that the search is to be performed in the order of area 63, area 31, and area 57 is the search route.

(Area That Can Be Searched with the Automatic Shooting Camera System)

FIG. 4 is a diagram showing an example of an environmental map generated by the map creation unit 213 that shows a searchable area from the current position of the automatic shooting camera system 101 specified by the position specifying unit 212.

As shown in FIG. 4, among a plurality of straight lines connecting the coordinates 401 indicating the current position of the automatic shooting camera system 101 and each vertex of each divided area, the divided area through which no straight lines that passes through an obstacle 402 that partition the space such as walls (thick black lines in FIG. 4) is determined as a searchable area 403 (white area in FIG. 4) that can be searched by the automatic shooting camera system 101. On the other hand, the divided area through which one or more straight lines that passes through the obstacle 402 is determined as a non-searchable area (shaded area in FIG. 4) that cannot be searched by the automatic shooting camera system 101.

(Area Already Explored with the Automatic Shooting Camera System)

Figure 5:
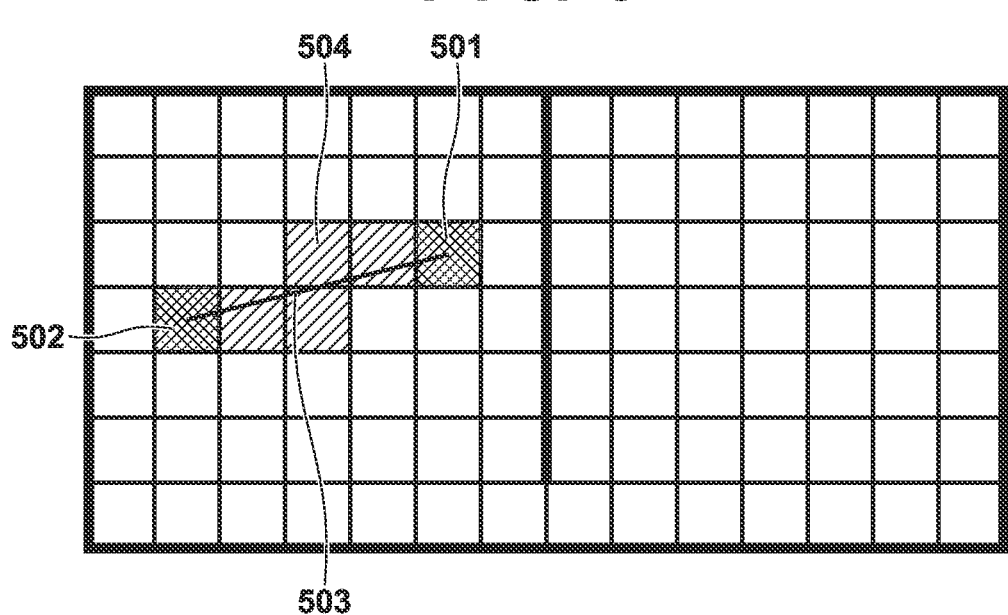
FIG. 5 is a diagram illustrating an example of an environmental map showing areas that have been searched by the automatic shooting camera system according to the first embodiment.

FIG. 5 is a diagram illustrating an example of an environmental map showing divided areas that have been searched by the automatic shooting camera system 101.

As shown in FIG. 5, the divided area 303 currently being searched by the automatic shooting camera system 101 is designated as a search start area 501, and the divided area 303, which is the destination in the direction in which the automatic shooting camera system 101 will search next, is designated as a search end area 502. The divided areas through which a straight line 503 connecting the center coordinates of the search start area 501 and the center coordinates of the search end area 502 passes is defined as searched areas 504. Note that the search start area 501 and the search end area 502 are also the searched areas 504.

(Searching for and Shooting a Subject Based on the Probability of Existence of Subject)

FIG. 6 is a flowchart illustrating a series of processes in which the automatic shooting camera system 101 according to the first embodiment searches for and shoots a subject based on the probability of existence of subject.

When the main power of the automatic shooting camera system 101 is turned on, the control unit 214 starts searching for and shooting a subject based on the probability of existence of subject. Note that even during the search for the subject, the imaging unit 205 repeatedly performs shooting and performs processing to detect the subject in the obtained image data, but the image data processed for the search is not recorded.

In step S601, the control unit 214 reads out from the nonvolatile memory 215 an environmental map created in advance by the map creation unit 213 using the method described above.

Next, in step S602, the control unit 214 reads out the subject's action history information from the nonvolatile memory 215 and calculates the probability of existence of subject in each divided area 303. Note that details of calculation processing of the probability of existence of subject performed here will be described later with reference to FIG. 7.

In step S603, the control unit 214 updates the search route based on the probability of existence of subject in each divided area 303 calculated in step S602. Note that details of updating process of the search route performed here will be described later with reference to FIG. 8.

In step S604, the control unit 214 performs control to search for and shoot a subject. Note that details of process for searching for and shooting a subject performed here will be described later with reference to FIG. 9.

In step S605, the control unit 214 determines whether the shooting end condition is satisfied. For example, if the main power of the automatic shooting camera system 101 is turned off, or if an instruction to end shooting is received from an external information processing device to the automatic shooting camera system 101 via the connection unit 210, it is determined that the shooting end conditions are met. If the shooting end conditions are met, the processing ends. On the other hand, if the shooting end conditions are not met, the process advances to step S606.

In step S606, the control unit 214 determines whether a certain period of time has passed since the search route was updated in step S603. If a certain period of time has elapsed since the search route was passed, the process proceeds to step S602, and if the certain period of time has not passed, the process proceeds to step S607.

In step S607, the control unit 214 determines whether a predetermined number of pieces of subject's action history information has been recorded since the search route was updated in step S603. In step S607, if the number of pieces of the subject's action history information has increased by a predetermined number, the process advances to step S602, and if the number of pieces of the subject's action history information has not increased by the predetermined number, the process advances to step S604.

Through the processing described above, the automatic shooting camera system 101 can regularly and continuously search for and shoot a subject while taking into consideration the probability of existence of the subject.

(Calculation of Probability of Existence of Subject)

Next, the calculation process of the probability of existence of subject performed in step S602 will be explained using the flowchart of FIG. 7.

First, in step S701, the control unit 214 reads out the subject's action history information from the nonvolatile memory 215. Then, in step S702, it is determined whether or not the read subject's action history information holds any effective information (whether it is null or not). If effective information is held, the process advances to step S703; if not, the process advances to step S707. Note that at this time, the number of pieces of all the subject's action history information read out in step S701 may be counted, and it may be determined whether the counted number of pieces of the subject's action history information is greater than zero.

In the loop from step S703 to step S706, calculation of the probability of existence of subject is performed for the number of divided areas 303. At this time, processing is performed in ascending order from the divided areas 303 with the smallest identifier number. First, in step S704, the control unit 214 counts the number of pieces of the subject's action history information (hereinafter referred to as "number of histories") in the divided area 303 being processed for each subject.

Next, in step S705, the control unit 214 calculates the probability of existence of subject in each divided area 303 using the following calculation formula.

$$\text{(probability of existence of subject)} = \text{(number of histories of all subjects)} / \text{(total number of histories of all subjects)}$$

When the probability of existence of subject has been calculated for all divided areas 303, the process ends.

On the other hand, in step S707, the control unit 214 sets the probability of existence of subject in all divided areas 303 to 0. The process in step S707 is performed in an initial state where no subject's action history information is recorded.

Through the above processes, the probability of existence of subject is calculated by referring to the subject's action history information.

(Update of Search Route)

Next, the updating process of the search route performed in step S603 will be described using the flowchart in FIG. 8. Note that this processing is performed after calculating the probability of existence of subject in step S602.

In step S801, the control unit 214 registers the divided areas 303 in the search route in ascending order of the identifier numbers, the smallest the first, and initializes the search route. Here, all divided areas 303 are registered in the search route. This allows the search route to be updated even in the initial state where no subject's action history information is recorded.

Next, in step S802, the control unit 214 changes the order of the divided areas 303 registered in the search route based on the probabilities of existence of subject in the divided areas 303 so that the area with the highest probability of existence of subject comes first. Note that for areas with the same probability of existence of subject, the order is not changed, and the order remains as it was when initialized.

With the above process, it is possible to update the search route by referring to the environmental map and the subject's action history information.

(Searching for and Shooting the Subject)

Next, the process for searching for and shooting the subject performed in step S604 will be described using the flowchart in FIG. 9. Note that this processing is performed after the search route is determined in step S603.

In a loop from step S901 to step S912, searching for and shooting the subject is repeated for the number of divided areas 303 included in the search route.

First, in step S902, the control unit 214 determines whether or not the divided area 303 to be processed on the search route is the searchable area 403 that can be searched from the automatic shooting camera system 101. If the divided area 303 to be processed is the searchable area 403 that can be searched by the automatic shooting camera system 101, the process advances to step S903; if the divided area 303 to be processed is the non-searchable area 404 that cannot be searched, the process advances to step S912.

In step S903, the control unit 214 determines whether the divided area 303 to be processed is the searched area 504. If the divided area 303 to be processed is the searched area 504, the process advances to step S912, and if it is not the searched area 504, the process advances to step S904.

In step S904, the control unit 214 sets the divided area 303 currently being searched by the automatic shooting camera system 101 as the search start area 501 and the divided area 303 to be processed as the search end area 502, and rotates the imaging apparatus 102 from the search start area 501 toward the search end area 502 in the yaw direction and the pitch direction to search for a subject. In step S905, the control unit 214 determines whether a subject has been detected as a result of the search. As a result of the search, if a subject is detected, the process advances to step S906, and if no subject is detected, the process advances to step S912.

In the loop from step S906 to step S911, the detected subject is tracked until it is lost.

First, in step S907, the control unit 214 rotates the imaging apparatus 102 in the yaw direction and the pitch direction to track the detected subject. At this time, if the detected subject moves across two or more divided areas 303, the divided area/areas 303 to which the subject has moved in is/are set as the searched area/areas 504.

In step S908, the control unit 214 shoots the tracked subject, and in step S909, the control unit 214 records the tracked subject's action history information. Note that details of the recording process of the subject's action history information performed here will be described later with reference to FIG. 10.

In step S910, the control unit 214 determines whether the detected subject has been shot a predetermined number of times. If the subject has been shot the predetermined number of times, the process advances to step S912. If the subject has not been shot the predetermined number of times, the process advances to step S911. With the process of step S910, it is possible to start searching for another subject without continuing to shoot the detected subject.

Through the processing described above, it is possible to search for and shoot a subject.

Note that in this embodiment, the explanation is made under assumption that the subject is a person to be shot by the automatic shooting camera system 101, but the subject may be an animal such as a dog and cat. In that case, by defining a pattern for specifying the face and body of a dog or cat, it is possible to detect an area in the image that matches the pattern as the area of the dog or cat. By using the features extracted from the area of a dog or cat as identification information, a dog and cat can be distinguished in the same way as a person.

(Recording of Subject's Action History Information)

Next, the recording process of the subject's action history information performed in step S909 will be described using the flowchart in FIG. 10. This process is performed at regular time intervals while the subject is being recognized.

In step S1001, the control unit 214 generates subject information to be recorded, including identification information and date and time information of the subject, as shown in the table 13a in FIG. 13.

In step S1002, the control unit 214 selects the divided area 303 in which the subject recognized by the automatic shooting camera system 101 exists as the tracking area in which the subject information generated in step S1001 is to be recorded.

In step S1003, the control unit 214 records the subject information generated in step S1001 and the divided area 303 selected in step S1002 as the subject's action history information.

By the above method, the subject's action history information can be recorded.

(An Example of Subject's Action History Information Recorded while a Subject is Recognized)

FIG. 16 is a diagram showing an example of the subject's action history information recorded while a subject is recognized. For example, if the recording time interval is one minute and the automatic shooting camera continues to recognize the subject A, action history information as shown in FIG. 16 will be recorded. The action of the subject A moving from the divided area 303 with the identifier 62 to the divided area 303 with the identifier 58 is recorded as the action history information.

(Operation in a Case where the Installation Position of the Automatic Shooting Camera is Changed)

Next, an operation in a case where the installation position of the automatic shooting camera system 101 is changed will be explained.

The subject's action history information explained using FIG. 10 includes information about the divided area 303 where the subject has been existed. Further, the position of the automatic shooting camera system 101 can be determined by SLAM, and the positional relationship between the automatic shooting camera system 101 and the divided area 303 can also be determined. Therefore, for example, even if the installation position of the automatic shooting camera system 101 installed in the area 91 as shown in FIG. 4 is changed to the area 1, the subject's action history information recorded in association with the divided areas 303 can be used as is when calculating probability of existence of subject and updating search route. In other words, the subject's action history information recorded in association with the divided areas 303 is effective information when searching for a subject even when the automatic shooting camera system 101 is moved.

Figure 7:
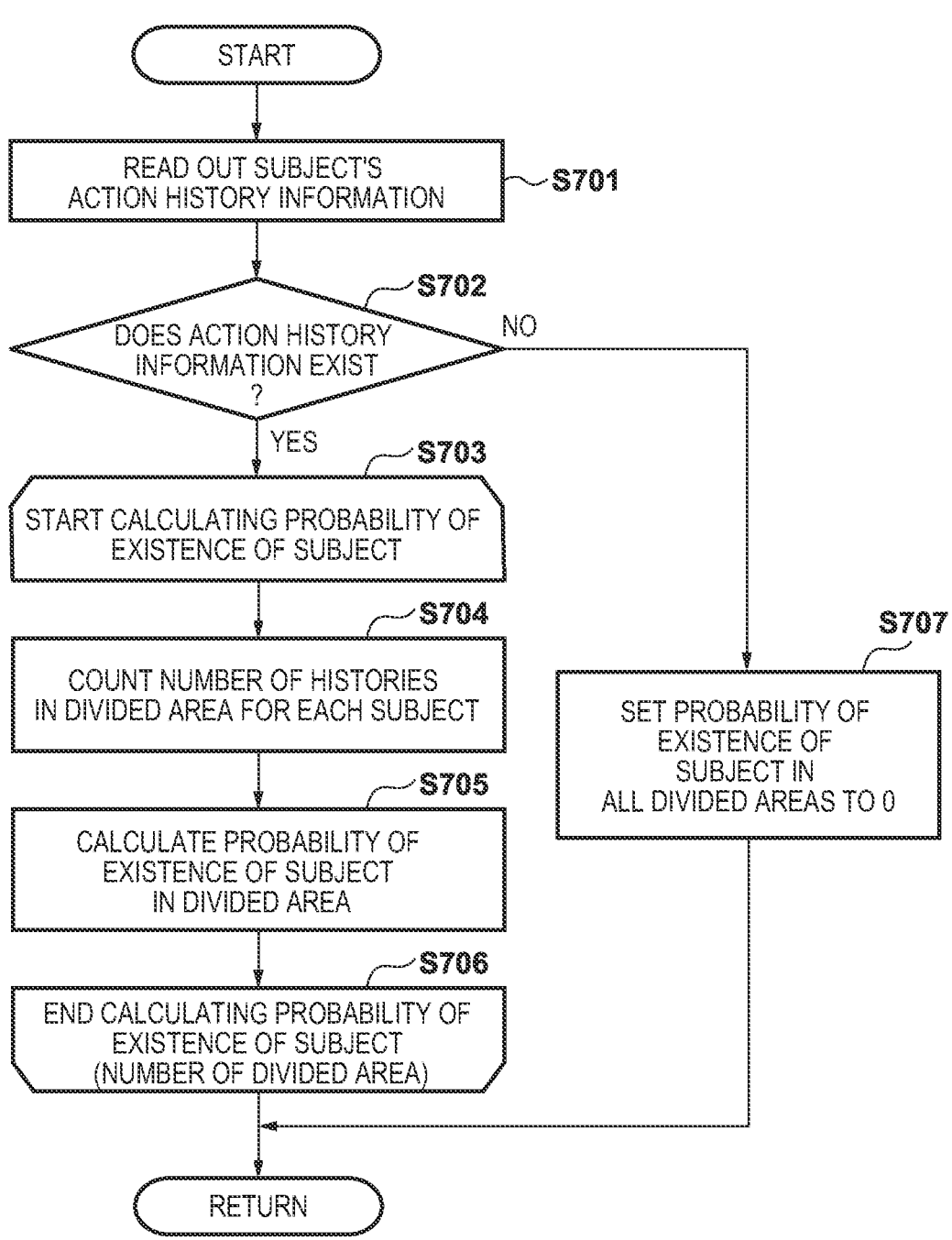
FIG. 7 is a flowchart illustrating a calculation process of probability of existence of subject according to the first embodiment.

Furthermore, the calculation of the probability of existence of subject explained using FIG. 7 is performed by calculating the probability of existence of subject for each divided area 303 based on the subject's action history information of the entire environmental map. Therefore, even if the automatic shooting camera system 101 is moved, the current probability of existence of the subject can be used as is, or it can be calculated based on the subject's action history information recorded in association with the divided areas 303.

Further, in updating the search route of the subject described using FIG. 8, all of the divided areas 303, that is, the entire environmental map, is registered in the search route. Therefore, even if the automatic shooting camera system 101 is moved, the current search route can be used as is or can be found based on the subject's action history information recorded in association with the divided areas 303.

Furthermore, in searching for and shooting the subject described using FIG. 9, the subject is searched based on the search route. At that time, it is determined whether the area to be searched next is searchable by the automatic shooting camera system 101, and if it is searchable, the search is performed. Therefore, even if the automatic shooting camera system 101 moves, searching for the subject can be continued from the divided area 303 that was being searched before the automatic shooting camera system 101 was moved.

As described above, according to the first embodiment, even if the installation position of the automatic shooting camera system 101 is changed, there is no need to perform various processes described above again, it is possible to continue searching for the subject and find the subject quickly.

Second Embodiment

A second embodiment of the present disclosure will be described below. Note that the configuration of an automatic shooting camera system in the second embodiment is the same as that of the automatic shooting camera system 101 described in the first embodiment with reference to FIGS. 1A, 1B, and 2, and therefore a description thereof will be omitted. Further, since an environmental map is also the same as that described with reference to FIGS. 3A to 5, the description thereof will be omitted.

The automatic shooting camera system 101 according to the second embodiment searches for a subject in a shorter time than the first embodiment by weighting the subject's action history information based on the search time. In this process, the second embodiment differs from the first embodiment only in the process of calculating the probability of existence of subject, and therefore the process thereof will be described with reference to the flowchart of FIG. 11. Note that the processes described using FIG. 6 and FIGS. 8 to 10 are the same as those described in the first embodiment, so the description thereof will be omitted.

Figure 11:
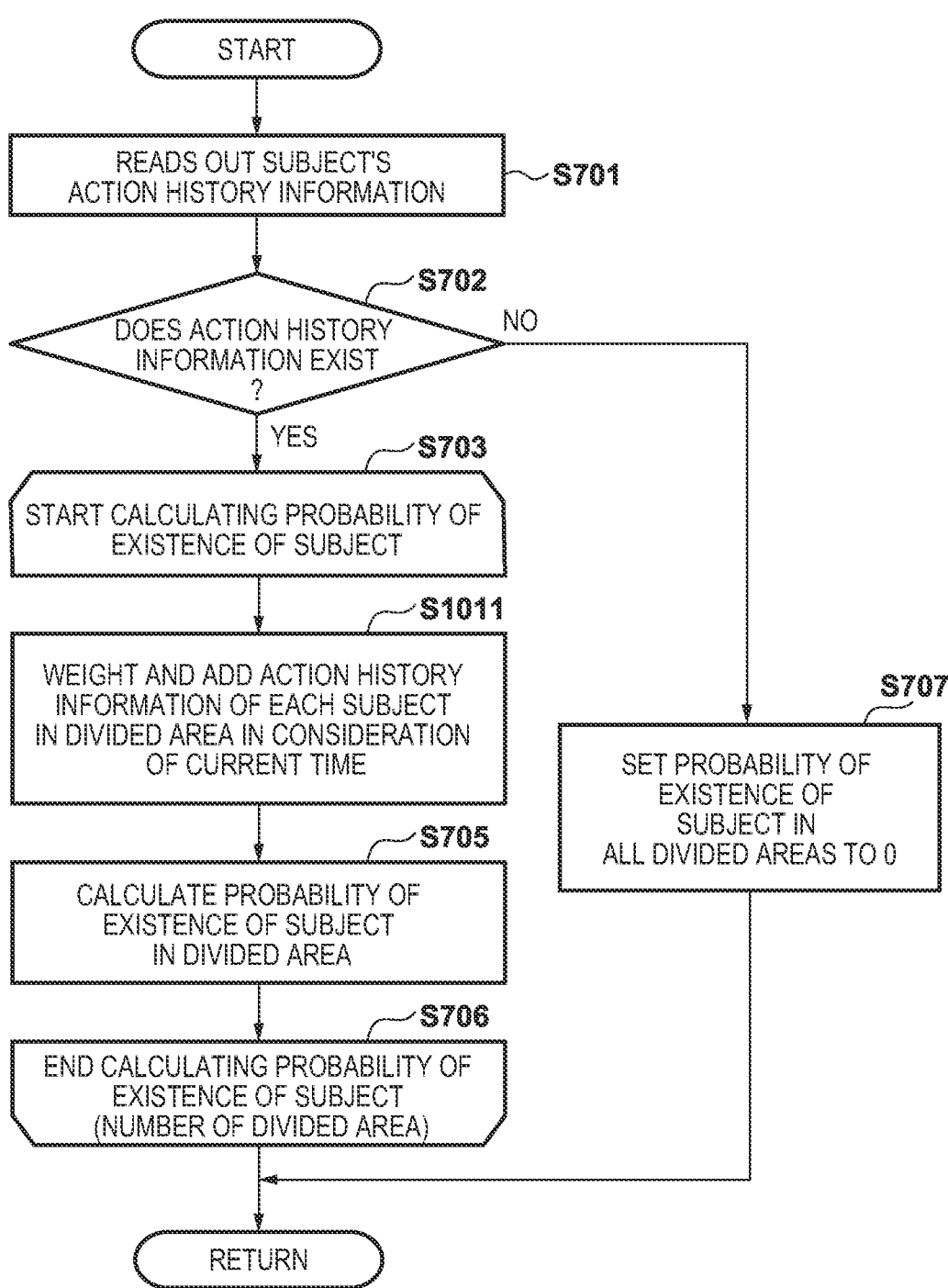
FIG. 11 is a flowchart illustrating a calculation process of probability of existence of subject according to a second embodiment.

FIG. 11 shows the calculation process of the probability of existence of subject performed in step S602 of FIG. 6, and is performed instead of the process shown in FIG. 7 described in the first embodiment. Further, the difference between the processing shown in FIG. 11 and the processing shown in FIG. 7 is that the process in step S1101 is performed instead of the process in step S704 in FIG. 7. Since the other processes are the same as those in FIG. 7, the same step numbers are given and the explanation thereof is omitted.

In step S704 described above, the control unit 214 counts the number of the pieces of the subject's action history information of one of the divided areas 303 for each subject. On the other hand, in step S1101, the control unit 214 weights the pieces of the subject's action history information according to the difference between the time when calculation of the probability of existence of subject was started and the time of the subject's action history information in the divided area 303 currently being processed. If not weighted, each piece of the subject's action history information is counted as 1, so a weighted value can be calculated using the following formula.

(weighting coefficient) =

$$1 \Big/ \Big( 1 + \Big| \frac{\text{calculation start time} - }{\text{time of subject's action history information}} \Big| \Big/ m \Big)$$

m: Any integer that satisfies 0<m

Note, the time shall be calculated in minutes.

In step S705, the probability of existence of subject in each divided area 303 is calculated using the weighted value added for each subject obtained in step S1101.

(An Example of Probability of Existence of Subject and Search Route Based on Search Time)

FIG. 14 are diagrams showing an example of the probability of existence of subject and search route calculated in consideration of the search time. Note that the subject's action history information shown in a table 14a is the same as the table 13a in FIG. 13, so that the difference from the first embodiment can be easily understood.

A table 14b shows a calculation result of the probability of existence of subject at 8 o'clock based on the subject's action history information shown in the table 14a. By weighting the subject's action history information near 8 o'clock so that its importance level becomes greater, the probability of existence of subject different from that shown in the table 13b is calculated.

A table 14c shows an updated search route based on the probability of existence of subject at 8 o'clock shown in the table 14b. Since the table 14b is different from the table 13b, the search route is also updated to a different route from the search route shown in the table 13c.

As described above, according to the second embodiment, the search route is determined by placing more emphasis on the subject's action history information obtained closer to the search time, so it is possible to perform the search according to the daily behavior of the subject. This makes it possible to find the subject in a shorter time.

Third Embodiment

A third embodiment of the present disclosure will be described below. Note that the configuration of an automatic shooting camera system in the third embodiment is the same as that of the automatic shooting camera system 101 described in the first embodiment with reference to FIGS. 1A, 1B, and 2, and therefore a description thereof will be omitted. Further, since an environmental map is also the same as that described with reference to FIGS. 3A to 5, the description thereof will be omitted.

The automatic shooting camera system 101 according to the third embodiment searches for a subject specified by the user in a shorter time than the first embodiment by referring to the subject's action history information specified by the user to calculate the probability of existence of the subject. In this process, the third embodiment differs from the first embodiment only in the process of calculating the probability of existence of subject, and therefore the process will be described with reference to the flowchart of FIG. 12. Note that the processes described using FIG. 6 and FIGS. 8 to 10 are the same as those described in the first embodiment, so the description thereof will be omitted.

FIG. 12 shows the calculation process of the probability of existence of subject performed in step S602 of FIG. 6, and is performed instead of the process shown in FIG. 7 described in the first embodiment. Further, the difference between the process shown in FIG. 12 and the process shown in FIG. 7 is that step S1201 is added and the processes of steps S1202 and S1203 are performed instead of the processes of steps S702 and S704 in FIG. 7. Since the other processes are the same as those in FIG. 7, the same step numbers are given and the explanation thereof is omitted.

First, in step S701, the control unit 214 reads out the subject's action history information from the nonvolatile memory 215, and in step S1201, accepts the user's designation of the subject. Here, for example, the user operates an information processing device such as a smartphone and transmits identification information of the subject to the automatic shooting camera system 101, thereby designating the subject to be searched for in the automatic shooting camera system 101. Alternatively, the control unit 214 transitions the automatic shooting camera system 101 to a special mode for specifying the subject to be searched for, and the user manually shoots the subject to designate the subject to be searched for.

In step S1202, the control unit 214 compares the identification information of the subject designated by the user and the identification information of the subject's action history information read out in step S701, and determines whether there is any subject's action history information with the same identification information. If there is any subject's action history information with the same identification information, the process advances to step S703, and if there is no such subject's action history information, the process advances to step S707.

After that, in step S1203, the control unit 214 compares the identification information of the subject designated by the user with the identification information of the subject's action history information in the divided area 303 currently being processed, and counts the number of pieces of the subject's action history information that has the same identification information.

(An Example of Probability of Existence of Subject Designated by User and Search Route)

FIG. 15 is a diagram illustrating an example of the existence probability and search route in a case where the user has designated the subject C. Note that the subject's action history information shown in a table 15a is the same as the table 13a in FIG. 13 so that the difference from the first embodiment can be easily understood.

A table 15b shows the calculation results of the existence probability of the subject C based on the subject's action history information shown in the table 15a. By calculating the existence probability of subject based on the action history information of the subject C designated by the user, a probability of existence of subject different from that in the table 13b is obtained.

A table 15c shows the updated search route based on the existence probability of the subject C shown in the table 15b. Since the table 15b is different from the table 13b, the search route is also updated to a different route from the search route shown in the table 13c.

As described above, according to the third embodiment, it is possible to create a search route according to the subject designated by the user, so it is possible to search for the subject designate by the user in a shorter time.

Other Embodiments

Note that the present disclosure may be applied to a system composed of a plurality of devices, or to a device composed of a single device. For example, in the embodiment described above, the imaging apparatus 102 creates an environmental map based on captured images and determines the order to search for a subject based on history information, but an imaging control apparatus provided separately from the imaging apparatus may perform these processes. In that case, the imaging control apparatus includes a unit for communicating with the imaging apparatus, and acquires image data by receiving image data from the imaging apparatus via the communication unit. Further, via the communication unit, the determined order of searching for a subject may be transmitted to the imaging apparatus, or information on the orientation of the imaging unit corresponding to the direction in which images should be taken based on the order may be transmitted to the imaging apparatus, thereby it is possible to control the orientation of the imaging unit provided in the imaging apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-004062, filed Jan. 13, 2023 which is hereby incorporated by reference herein in its entirety.

What is claimed is:

1. An image shooting control apparatus comprising one or more processors which function as:
   an acquisition unit that acquires image data obtained through repeated shooting by an image sensor;
   a detection unit that detects a subject from the image data;
   a map creation unit that creates an environmental map based on information obtained by measuring surrounding environment;
   a storage unit that stores a plurality of pieces of history information, each piece associating (i) the subject, (ii) time information indicating a time at which the subject was detected, and (iii) a divided area in which the subject was detected among a plurality of divided areas obtained by dividing the environmental map;
   a determination unit that determines an order of the plurality of divided areas to be searched for the subject based on a plurality of stored pieces of the history information having different time stamps; and
   a control unit that controls an orientation of the image sensor,
   wherein the control unit controls the image sensor to shoot the plurality of divided areas in the order determined by the determination unit.

2. The image shooting control apparatus according to claim 1, wherein the map creation unit creates the environmental map based on information obtained from a sensor for Simultaneous Localization And Mapping (SLAM).

3. The image shooting control apparatus according to claim 1, wherein the control unit controls the orientation of the image sensor to shoot a divided area to be shot next determined in the order in a case where the subject is not detected from the image data of a divided area obtained by shooting.

4. The image shooting control apparatus according to claim 1, wherein the control unit controls the orientation of the image sensor to track the subject in a case where the subject is detected from the image data of a divided area obtained by shooting, and the storage unit stores the history information a predetermined number of times at predetermined time intervals.

5. The image shooting control apparatus according to claim 1, wherein the detection unit detects at least one subject, the storage unit stores the history information of each subject, and the determination unit finds the probability of existence of each subject.

6. The image shooting control apparatus according to claim 1, wherein, in a case where the subject is detected from the image data of a divided area obtained by shooting, after the storage unit stores the history information a predetermined number of time, the control unit controls the orientation of the image sensor to shoot a divided area to be shot next determined in the order.

7. The image shooting control apparatus according to claim 1, wherein the determination unit re-determines the order in a case where a predetermined time has passed since the order was determined.

8. The image shooting control apparatus according to claim 1, wherein the determination unit re-determines the order in a case where a predetermined number of pieces of the history information are stored since the order was determined.

9. The image shooting control apparatus according to claim 1, wherein the history information includes information on time when the image data in which the subject is detected was acquired.

10. The image shooting control apparatus according to claim 9, wherein the determination unit weights pieces of the history information based on the information on time to determine the probability of existence.

11. The image shooting control apparatus according to claim 10, further comprising an operation unit that accepts an operation from outside,
   wherein the determination unit puts more weight on a piece of the history information having the information on time closer to time designated using the operation unit.

12. The image shooting control apparatus according to claim 1, further comprising an operation unit that accepts an operation from outside,
   wherein the determination unit finds the probability of existence based on the history information of a subject designated using the operation unit.

13. The image shooting control apparatus according to claim 1, further comprising a communication unit that communicates with an image capturing apparatus that comprises the image sensor,
   wherein the acquisition unit acquires the image data from the image capturing apparatus through the communication unit, and
   wherein the control unit sends a control signal to the image capturing apparatus through the communication unit to control the orientation of the image sensor.

14. The image shooting control apparatus according to claim 1, wherein the map creation unit generates the environmental map in a world coordinate system.

15. The image shooting control apparatus according to claim 1, wherein the determination unit obtains the probability of existence of the subject for each of the plurality of divided areas based on a number of times the subject has been detected and a weight that is set based on the time at which the subject was detected.

16. The image shooting control apparatus according to claim 1 having a mode for obtaining the probability of existence of the subject that is designated by a user.

17. The image shooting control apparatus according to claim 1 further comprising an image sensor,
   wherein the control unit controls the image sensor to track the subject detected by the detection unit and to shoot images of the subject.

18. The image shooting control apparatus according to claim 1, wherein the order of the plurality of divided areas to be searched by the determination unit initiates with a divided area having a highest probability of existence of the subject and terminates with a divided area having the lowest probability of existence of the subject.

19. The image shooting control apparatus according to claim 1, wherein the determination unit obtains probability of existence of the subject for each of the plurality of divided areas based on the plurality of stored pieces of the history information having different time stamps, and determines the order of the plurality of divided areas to be searched for the subject based on the probability of existence.

20. An image capturing apparatus comprising:

an image shooting control apparatus having one or more processors which function as:

an acquisition unit that acquires image data obtained through repeated shooting by an image sensor;

a detection unit that detects a subject from the image data;

a map creation unit that creates an environmental map based on information obtained by measuring surrounding environment;

a storage unit that stores a plurality of pieces of history information, each piece associating (i) the subject, (ii) time information indicating a time at which the subject was detected, and (iii) a divided area in which the subject was detected among a plurality of divided areas obtained by dividing the environmental map;

a determination unit that determines an order of the plurality of divided areas to be searched for the subject based on a plurality of stored pieces of the history information having different time stamps; and a control unit that controls an orientation of the image sensor, the image sensor; and a drive unit that drives the image sensor to change its orientation based on the control of the control unit, wherein the control unit controls the image sensor to shoot the plurality of divided areas in the order determined by the determination unit.

21. A control method of an image shooting control apparatus comprising:

causing an image sensor to repeat shooting and output image data;

detecting a subject from the image data;

creating an environmental map based on information obtained by measuring surrounding environment;

storing a plurality of pieces of history information, each piece associating (i) the subject, (ii) time information indicating a time at which the subject was detected, and (iii) a divided area in which the subject was detected among a plurality of divided areas obtained by dividing the environmental map;

determining an order of the plurality of divided areas to be searched for the subject based on a plurality of stored pieces of the history information having different time stamps; and changing an orientation of the image sensor based on the order.

22. A non-transitory computer-readable storage medium, the storage medium storing a program that is executable by the computer, wherein the program includes program code for causing the computer to executes each step of the control method of the image capturing apparatus comprising:

causing an image sensor to repeat shooting and output image data;

detecting a subject from the image data;

creating an environmental map based on information obtained by measuring surrounding environment;

storing a plurality of pieces of history information, each piece associating (i) the subject, (ii) time information indicating a time at which the subject was detected, and (iii) a divided area in which the subject was detected among a plurality of divided areas obtained by dividing the environmental map;

determining an order of the plurality of divided areas to be searched for the subject based on a plurality of stored pieces of the history information having different time stamps; and changing an orientation of the image sensor based on the order.

\* \* \* \* \*